United States Patent
Manger et al.

(10) Patent No.: US 10,400,849 B2
(45) Date of Patent: Sep. 3, 2019

(54) ADJUSTABLE DAMPING VALVE DEVICE

(71) Applicant: ZF FRIEDRICHSHAFEN AG, Friedrichshafen (DE)

(72) Inventors: Thomas Manger, Wasserlosen (DE); Stefan Schmitt, Gochsheim (DE); Bernd Zeissner, Volkach (DE); Thomas Solf, Sulzheim (DE); Lukas Ruhmann, Memmelsdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 124 days.

(21) Appl. No.: 15/526,486

(22) PCT Filed: Nov. 10, 2015

(86) PCT No.: PCT/EP2015/076120
§ 371 (c)(1),
(2) Date: May 12, 2017

(87) PCT Pub. No.: WO2016/091506
PCT Pub. Date: Jun. 16, 2016

(65) Prior Publication Data
US 2017/0314634 A1 Nov. 2, 2017

(30) Foreign Application Priority Data

Dec. 12, 2014 (DE) .................. 10 2014 225 702

(51) Int. Cl.
*F16F 9/516* (2006.01)
*F16F 9/46* (2006.01)
(Continued)

(52) U.S. Cl.
CPC ............... *F16F 9/516* (2013.01); *F16F 9/34* (2013.01); *F16F 9/464* (2013.01); *F16F 9/16* (2013.01); *F16F 9/46* (2013.01); *F16F 2228/06* (2013.01)

(58) Field of Classification Search
CPC .... F16F 9/516; F16F 9/34; F16F 9/464; F16F 9/16; F16F 2228/06; F16F 9/06;
(Continued)

(56) References Cited

U.S. PATENT DOCUMENTS 4,795,008 A * 1/1989 Joseph ................. B62D 55/112
188/280
5,375,683 A * 12/1994 Huang .................... F16F 9/096
188/266.6
(Continued)

FOREIGN PATENT DOCUMENTS

DE 34 34 877 4/1986
DE 3631714 A1 * 4/1988 ............. B60G 17/08
(Continued)

*Primary Examiner* — Craig J Price
(74) *Attorney, Agent, or Firm* — Cozen O'Connor

(57) ABSTRACT

An adjustable damping valve device has a first adjustable damping valve assembly for a first flow direction and a second adjustable damping valve assembly for a second flow direction. The two damping valve assemblies are adjustable independently from one another, and the first damping valve assembly generates a damping force for only one flow direction and the second damping valve assembly has a minimum cross section through which damping medium can flow in the setting for maximum damping force so that the second damping valve device generates a damping force in both flow directions.

14 Claims, 6 Drawing Sheets

(51) Int. Cl.
*F16F 9/34* (2006.01)
*F16F 9/16* (2006.01)

(58) Field of Classification Search
CPC ...... F16F 9/32; F16F 9/325; F16F 9/46; F16F 9/48; F16F 9/466; F16F 9/3485; F16F 9/512; B60G 17/08; B60G 13/06; Y10T 137/87169; Y10T 137/87193; F16K 31/0655; F16K 31/0686–31/0696
USPC .......... 137/596–596.2, 493–493.9, 512–513, 137/514–514.7; 188/299, 285, 322.13, 188/322.19, 322.2, 282.6, 282.5, 281, 188/266.6, 316–320, 282.2–282.4
See application file for complete search history.

(56) References Cited

U.S. PATENT DOCUMENTS

| | | | | |
|---|---|---|---|---|
| 5,586,627 | A * | 12/1996 | Nezu | B60G 17/08 |
| | | | | 188/266.6 |
| 8,025,272 | B2 * | 9/2011 | Schallmeier | F16F 9/465 |
| | | | | 188/322.15 |
| 8,322,369 | B2 * | 12/2012 | Schmidt | F16F 9/466 |
| | | | | 137/614.2 |
| 8,613,348 | B2 | 12/2013 | Hamers et al. | |
| 9,163,693 | B2 * | 10/2015 | Forster | F16F 9/464 |
| 9,267,607 | B2 * | 2/2016 | Forster | F16F 9/464 |
| 9,297,437 | B2 * | 3/2016 | Forster | F16F 9/464 |
| 9,447,835 | B2 * | 9/2016 | Kim | F16F 9/512 |
| 9,599,183 | B2 * | 3/2017 | Kamakura | F16F 9/464 |
| 9,618,138 | B2 * | 4/2017 | Manger | F16F 9/3481 |
| 10,030,786 | B2 * | 7/2018 | Manger | F16K 31/0696 |
| 10,060,543 | B2 * | 8/2018 | Manger | F16F 9/464 |
| 2005/0121273 | A1 * | 6/2005 | Hamers | F16F 9/466 |
| | | | | 188/322.2 |
| 2011/0042174 | A1 * | 2/2011 | Hamers | F16F 9/464 |
| | | | | 188/322.13 |
| 2013/0341540 | A1 * | 12/2013 | Manger | F16F 9/46 |
| | | | | 251/30.01 |
| 2014/0116825 | A1 * | 5/2014 | Lindeman | F16F 9/464 |
| | | | | 188/266.2 |
| 2015/0076376 | A1 * | 3/2015 | Manger | F16K 31/0696 |
| | | | | 251/54 |
| 2017/0152910 | A1 * | 6/2017 | Schaffelhofer | B60G 13/08 |
| 2018/0209505 | A1 * | 7/2018 | Schmidt | F16F 9/34 |

FOREIGN PATENT DOCUMENTS

| | | |
|---|---|---|
| DE | 38 27 255 | 2/1990 |
| DE | 197 31 138 | 2/1999 |
| DE | 10 2008 015 412 | 10/2009 |
| DE | 10 2008 015 415 | 10/2009 |
| EP | 0 715 091 | 6/1996 |
| EP | 1 657 469 | 5/2006 |
| EP | 1 959 154 | 8/2008 |
| EP | 2 108 957 | 10/2009 |

* cited by examiner

ADJUSTABLE DAMPING VALVE DEVICE

CROSS REFERENCE TO RELATED APPLICATIONS

This is a U.S. national stage of application No. PCT/EP2015/076120, filed on Nov. 10, 2015. Priority is claimed German Application No. DE102014225702.6, filed Dec. 12, 2014, the content of which is incorporated here by reference.

BACKGROUND OF THE INVENTION

1. Field of the Invention

The invention is directed to an adjustable damping valve device.

2. Description of the Prior Art

A damping valve device, which is continuously adjustable, is known from DE 10 2008 015 412 B4. A further basic function consists in that a separate damping valve assembly is provided for one movement direction of a piston rod of a vibration damper outfitted with the damping valve device, i.e., every damping valve assembly generates a damping force only for an individual movement direction of the piston rod. Basically, this constructional form affords the substantial advantage that the damping force characteristic of the one damping valve assembly is selected and can be technically implemented independently of the damping force characteristic of the second damping valve assembly.

However, if the desire is to achieve appreciably different damping force characteristics in damping valve assemblies, then the damping valve assemblies differ with respect to the dimensions of individual component parts, e.g., valve springs. This variance in component parts makes the damping valve assemblies more expensive. It would be optimal if a standardized damping valve assembly could be used for both piston rod movement directions and any differences in damping force characteristics could simply be realized by electrical control of the damping valve assemblies. Owing to the sometimes distinct differences in damping force characteristics for damping the piston rod movement in compression direction and in extension direction, the limits are sometimes already reached, i.e., the differences in damping force characteristics can no longer be achieved via electrical control of the damping valve assemblies in all cases.

SUMMARY OF THE INVENTION

It is an object of the present invention to improve variability with respect to the damping force characteristic of a damping valve device.

According to one aspect of the invention, this object is met in that the first damping valve assembly generates a damping force for only one flow direction and the second damping valve assembly has a minimum cross section through which damping medium can flow in the setting for maximum damping force so that the second damping valve device generates a damping force in both flow directions.

With this principle of construction of a damping valve device, the independent damping valve adjustment for each flow direction is preserved on the one hand, i.e., a strict separation is possible for a damping of an extension movement of a piston rod out of the cylinder and a compression movement of the piston rod into the cylinder. If the damping force adjustment for damping the compression movement is changed, for example, this adjustment has no influence on the damping force during an extension movement.

The compression movement should generally be damped less than the extension movement for reasons of comfort. A main volume flow passes through the first damping valve assembly during a compression movement and an auxiliary flow can take place via the minimum cross section of the second damping valve assembly. The second damping valve assembly is arranged hydraulically in parallel with the first damping valve assembly. Accordingly, the damping force characteristic of the entire damping valve device can be decreased for damping the compression movement of the piston rod without having to use different damping valve assemblies. Accordingly, a standardized construction can be used for the damping valve assemblies while nevertheless achieving distinctly different damping force characteristics.

It is advantageously provided that both damping valve assemblies are arranged in a common housing. The flow paths are simplified in this way.

The housing for each damping valve assembly advantageously has a valve chamber, and the valve chambers are spatially separated from one another by a dividing wall. The spatial separation of two valve chambers facilitates the guiding of flow to the two damping valve assemblies.

A further simplification in the construction of a damping valve device consists in that each valve chamber has only one connection to an individual working chamber of a vibration damper.

It is further provided that a check valve assembly is associated with at least one damping valve assembly, and the check valve assembly releases a complete passage in the one flow direction and a limited passage in the opposite direction. The check valve assembly can be held in a very simple manner, for example, through two layered valve disks that jointly execute an operating movement in one direction, and only one of the two valve disks releases a passage cross section in the other valve disk in a second incident flow direction. Accordingly, these component parts are extremely simple and, in addition, function reliably even in case of an outage of the power supply for controlling the damping valve device.

There is the option that the damping valve assembly has a passive inlet valve, and the check valve assembly is arranged in the inlet valve. The inlet valve is upstream of the adjustable valve inside the damping valve assembly, i.e., a main flow of damping medium passes the inlet valve initially and the adjustable damping valve subsequently.

Alternatively, there is the possibility that a check valve assembly is arranged in flow-off direction downstream of at least one adjustable damping valve assembly. The main flow can pass the minimum cross section of the second damping valve assembly in each flow direction, but further flow-off is blocked in an opposite flow direction so that no external damping force is generated for the blocked flow direction.

A solution that is optimized especially with respect to installation space consists in that the check valve assembly is arranged functionally in flow-in direction between the two adjustable damping valve assemblies.

Installation space analyses have confirmed that it is particularly advantageous when the check valve assembly is arranged inside the dividing wall.

An especially simple possibility for achieving the minimum cross section consists in that the damping valve assembly has a main stage valve body which, together with a valve seat surface, forms a main stage valve which provides the minimum cross section.

It is provided in an embodiment form that the minimum cross section is formed by a pre-opening valve which is arranged functionally in parallel with the adjustable damping valve assembly. This embodiment offers the advantage that the two damping valve assemblies can be constructed identically in every detail. The shifting of the damping force characteristic for an enhanced comfort range is carried out with the pre-opening valve which is only active in one flow direction.

In order to minimize the quantity of component parts required, the pre-opening valve makes up part of the check valve arrangement.

In a preferred embodiment form, the check valve arrangement has two check valves opening in opposite directions. Two check valves can be uniquely switched with an individual spring arrangement as part of the check valve arrangement.

The invention will be described more fully based on the following description of the drawings.

DETAILED DESCRIPTION OF THE PRESENTLY PREFERRED EMBODIMENTS

Figure 1:
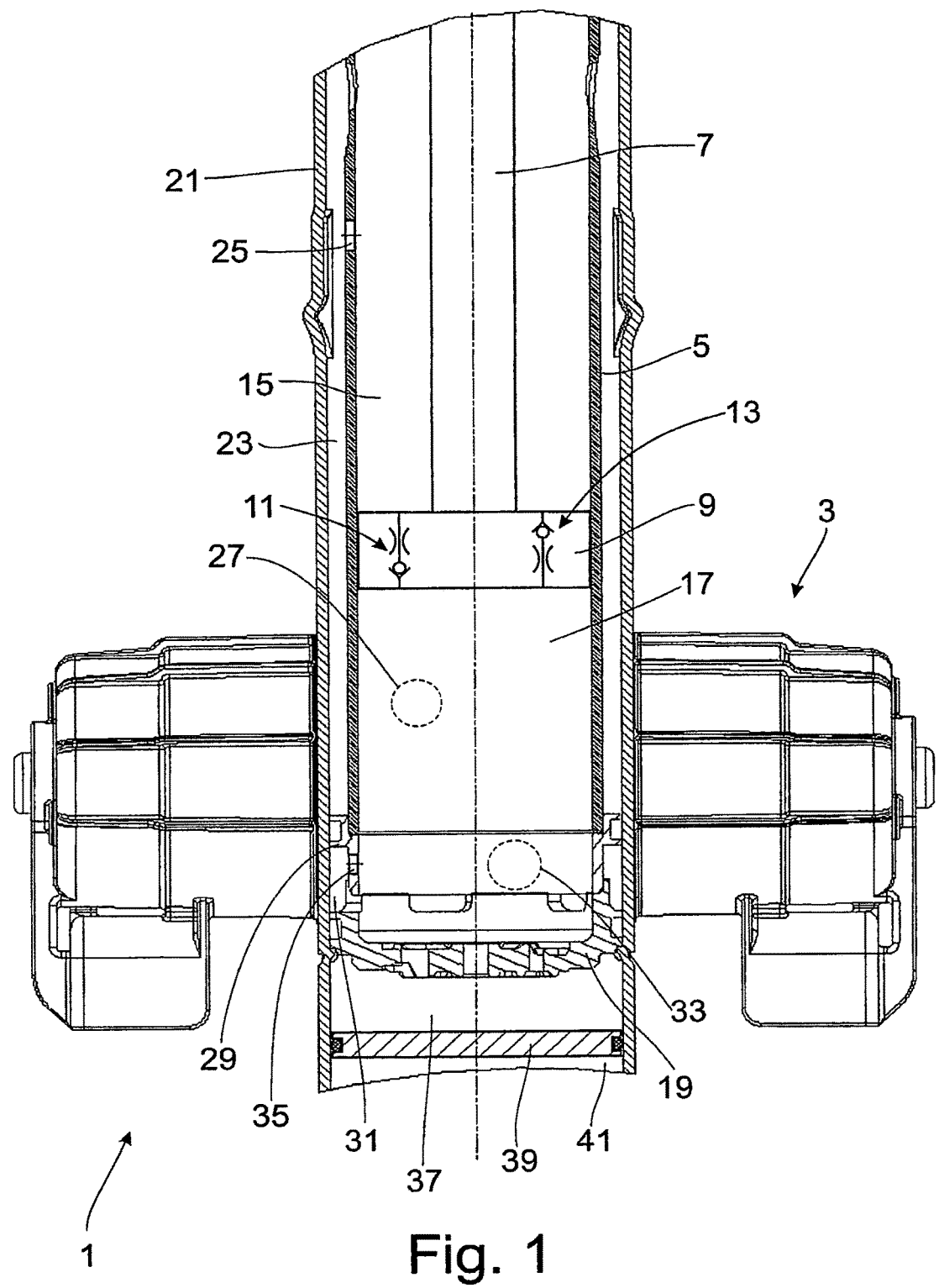
FIG. 1 is a section from a vibration damper with an adjustable damping valve device.

FIG. 1 shows a section from a vibration damper 1 with an adjustable damping valve device 3. The vibration damper 1 comprises an inner cylinder 5 in which a piston rod 7 is axially moveably guided together with a piston 9. Damping valves 11; 13 for one movement direction of the piston rod 7, respectively, are optionally possible and are shown in the drawing as switch symbols because there is a large number of possible configurations. Piston 9 divides the inner cylinder 5 into a working chamber 15 on the piston rod side and a working chamber 17 remote of the piston rod, each working chamber 15; 17 being completely filled with damping medium.

The inner cylinder 5 is supported on a bottom valve support 19. The bottom valve function is considered optional. A simple open end of the inner cylinder 5 in the area of the working chamber 17 remote of the piston rod could also be provided.

Together with the inner cylinder 5, an outer cylinder 21 forms a flow passage 23 between at least one connection orifice 25 in the working chamber 15 on the piston rod side and a first connection orifice 27 of the adjustable damping valve device. The connection orifice 25 inside the wall of the inner cylinder 5 tends to be at the end of the extension stroke of the piston rod 7.

The bottom valve support 19 has a circumferential sealed collar 29 that seals the flow passage 23 between the working chamber 15 on the piston rod side and the damping valve device 3 from a second flow passage 31 between the working chamber 17 remote of the piston rod and a second connection orifice 33 to the damping valve device 3. The second flow passage 31 is connected to the working chamber 17 remote of the piston rod via a connection orifice 35 in the bottom valve support 19.

Connected on the other side of the bottom valve support 19 in axial extension is a compensation space 37 with a displaceable dividing piston 37 to a gas space 41.

During an extension movement, the damping medium displaced by the piston is supplied to the damping valve device 3 via the first flow passage 23. Damping medium passes out of the damping valve device 3 into the piston rod side working chamber 17 via the second flow passage 31.

Figure 2:
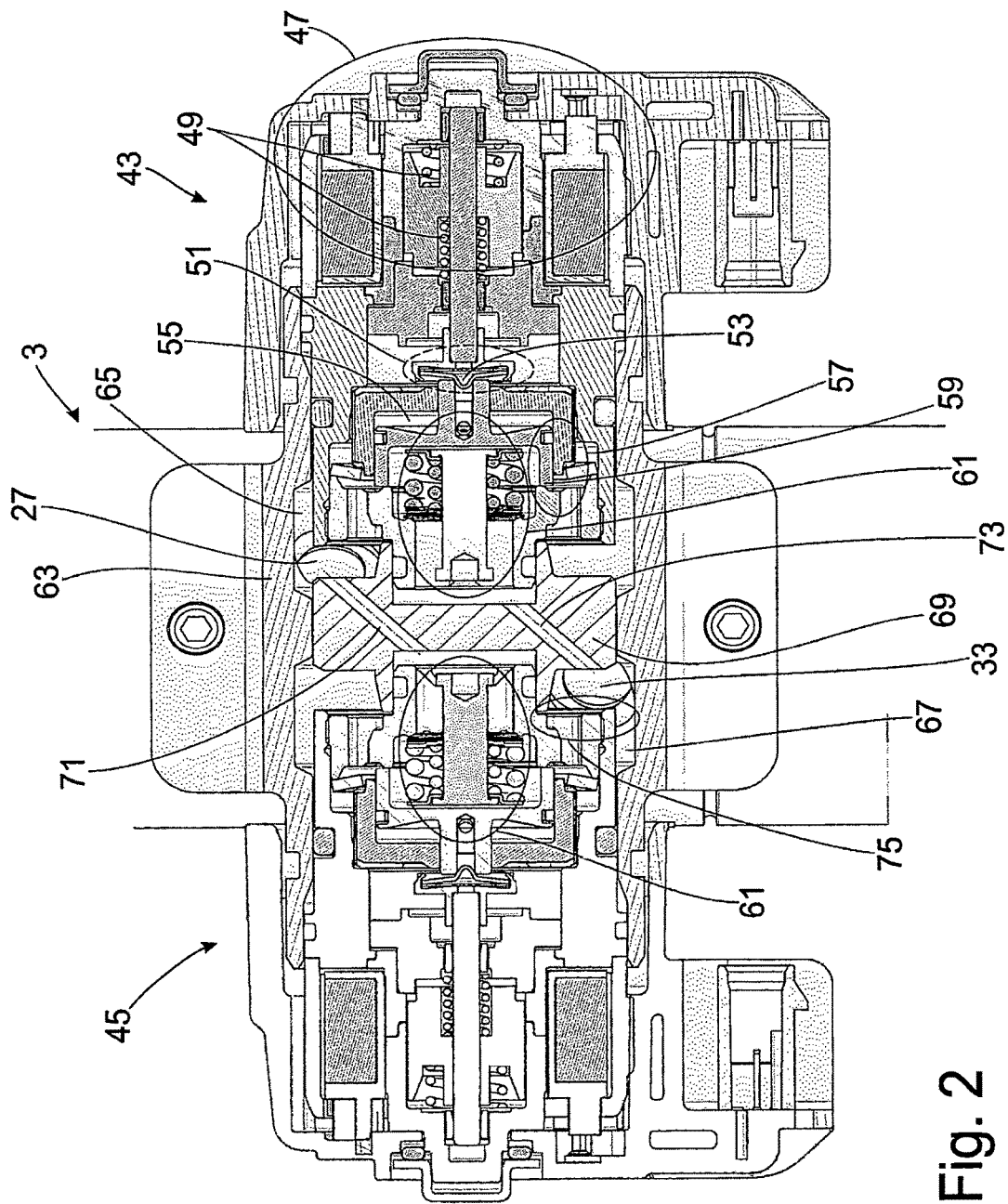
FIG. 2 is a damping valve assembly in a sectional view.

FIG. 2 shows a possible embodiment form of the damping valve device 3 in a sectional view. The damping valve device 3 comprises two adjustable damping valve assemblies 43; 45. The two damping valve assemblies 43; 45 have an identical basic construction. An electromechanical actuator 47 for each damping valve assembly 43; 45 loads a pre-stage valve body 51 against a pre-stage valve spring arrangement 49. A pre-stage valve valve body 53 defines a flow-off cross section at the pre-stage valve 51, and the flow-off cross section in turn defines a control pressure in a control space 55 of a main stage valve 57. The control pressure in the control space 55 determines a closing force on a main stage valve body 59 against an opening force based on a working pressure in one of the working chambers 15; 17 when the piston rod executes a displacing movement. In this embodiment example, a passive inlet valve 61 is additionally arranged upstream of the main stage valve 57.

The two damping valve assemblies 43; 45 are arranged in a common housing 63. Housing 63 has a valve chamber 65; 67 for each damping valve assembly 43; 45, the two valve chambers 65; 67 being spatially separated from one another by a dividing wall 69. The connection orifice 27 leads into valve chamber 65 in which is arranged damping valve assembly 43 for damping the compression movement of the piston rod 7. At least one connection channel 71 guides the damping out of valve chamber 65 to inlet valve 61 of the adjustable damping valve assembly 45 for damping the extension movement of the piston rod 7.

Depending on the energizing of the actuator 47, a closing force of varying magnitude acts on the main stage valve body 59 of the damping valve assembly 45. The damping medium flowing through the main stage valve 57 flows out of the valve chamber 67 into the working chamber 17 remote of the piston rod via connection orifice 33. Proceeding from connection orifice 27, there is no flow through the damping valve assembly for damping the compression direction because a check valve valve arrangement 75 according to FIG. 3 or FIG. 4 prevents flow into the main stage valve 57 of assembly 43.

During a compression movement of the piston rod 7, damping medium is conveyed out of the working chamber 17 remote of the piston rod 7 via connection orifice 33 into valve chamber 67 of the damping valve assembly 67 for damping the extension movement of piston rod 7. A main flow of the displaced damping medium flows via connection channel 73 to damping valve assembly 43. The damping medium passes the upstream inlet valve 61 and follows the flow path into valve chamber 65 via the main stage valve 57. The check valve arrangement 75 according to FIG. 3 or 4 lifts with a negligible resistance.

An auxiliary flow can pass the opening check valve assembly 75 of the damping valve assembly 45 for the extension direction. A possible embodiment form of the check valve assembly 75 is fastened to the outlet from the main stage valve 57 and is shown in an enlarged view in FIG. 3

Figure 5:
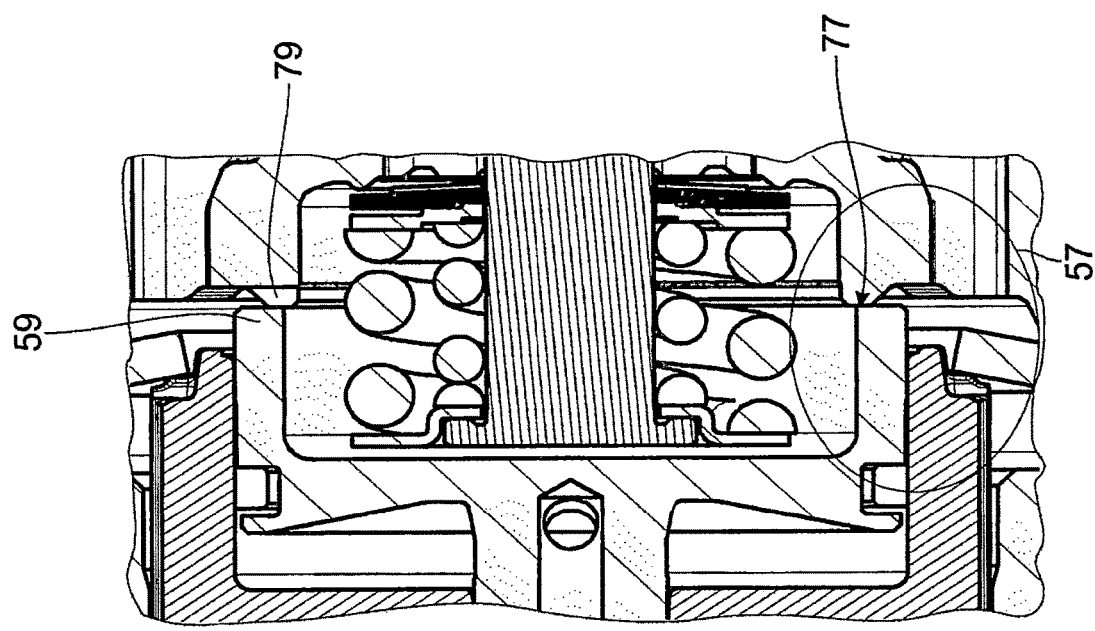
FIG. 5 is a main stage valve in detail.

The main stage valve body 59 and a valve seat surface 77 form the main stage valve 57 as shown in an enlarged view in FIG. 5. This main stage valve 57 provides a minimum cross section 79 that is constantly open even when the main stage valve 57 is closed to the maximum extent. The minimum cross section 79 can be carried out, for example, via a stamping in the valve seat surface 57 or main stage valve body 59. This minimum cross section 79 increases the existing passage cross section between the two working chambers 15; 17 inside the damping valve device 3 independently from the control of the main stage valve 57 of the damping valve assembly 45. With a comparable displacer behavior of the piston rod 7 with piston 9, there is accordingly a larger total cross section available in compression direction of the piston rod 7 than during an extension movement of the piston rod 7. There is flow through both damping valve assemblies 43; 45 in the compression direction of piston rod 7 and through only one damper valve assembly 45 during an extension movement.

The check valve arrangement 75 at the outlet from the main stage valve 57 presents one possible embodiment form. Alternatively, the inlet valve 61 of damping valve assembly 45 can also fulfill this function. The inlet valve 61 of damping valve assembly 45 is shown in an enlarged view in FIG. 4. A first elastic valve disk 82 is preloaded on a valve seat surface 84 at the end of a flow-in channel 81. Following in the flow-in direction into the flow-in channel 81 is a cover disk 83 which covers a cutout 85 in the flow-in disk. Accordingly, the flow into the flow-in channel 81 is possible via the lifting cover disk 83 against a slight preloading.

However, as a result of combining the cover disk 83 with the valve disk 82 the flow out of channel 81 is possible only against an appreciably greater opening resistance.

Figure 3:
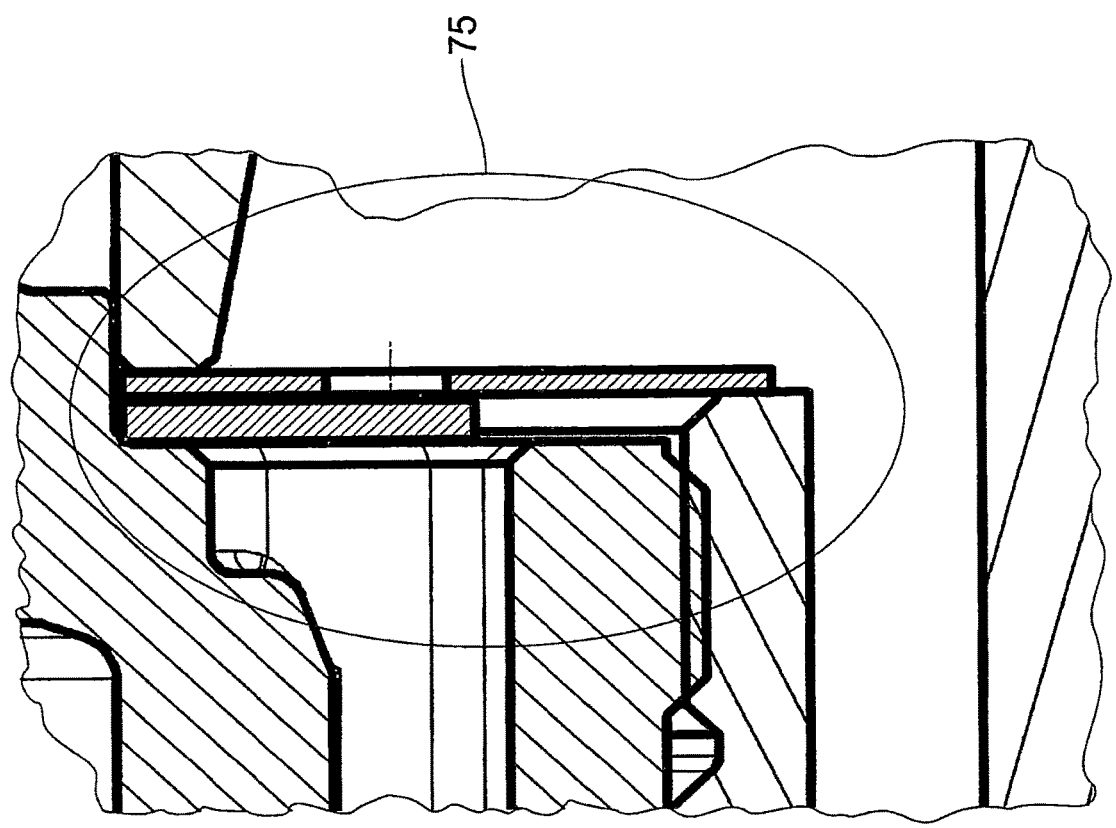
FIGS. 3 and 4 are sections of the check valve assembly from FIG. 2.

In a construction according to FIG. 3, the auxiliary flow of damping medium proceeding from the check valve arrangement initially flows through the check valve arrangement 75 and then through the main stage valve, or the check valve arrangement is upstream of the main stage valve 57 in flow direction proceeding from the working chamber 17 remote of the piston rod 7. In the type of construction shown in FIG. 4, the flow path leads through the open minimum cross section 79 and subsequently through the check valve arrangement 75, or the check valve arrangement 75 is downstream of the main stage valve 57 in flow direction.

Figure 6:
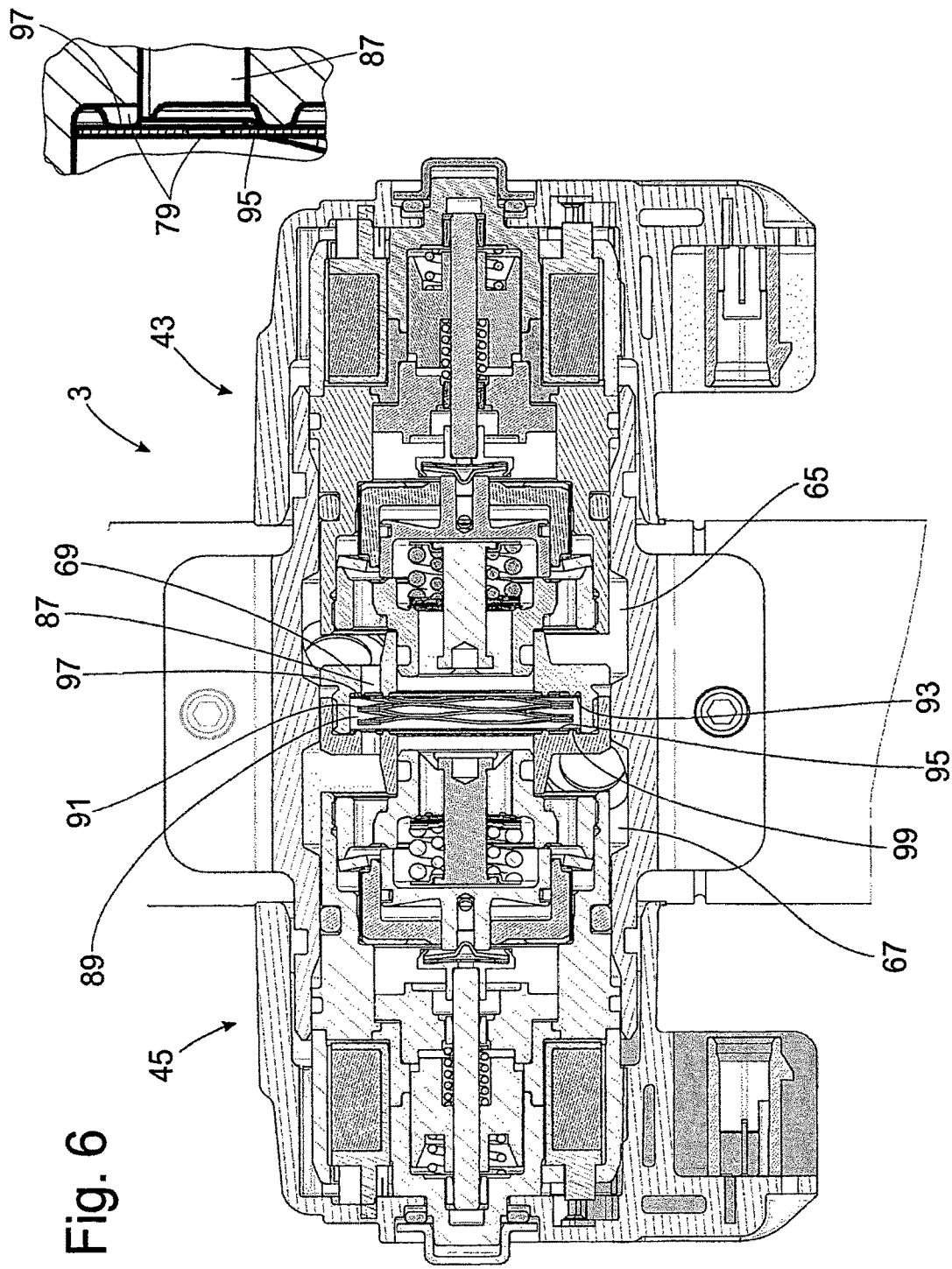
FIG. 6 is a damping valve assembly with a check valve assembly inside a dividing wall of the damping valve device.

In contrast to the construction according to FIG. 2, FIG. 6 shows an embodiment form of the damping valve device 3 in which the dividing wall 69 has a connection channel 87 divided in axial direction rather than diagonally extending connection channels 71; 73. The connection channel 87 has a distributor space 89 in which is arranged at least one closing spring 91 that preloads two valve disks 93; 95 on opposite valve seat surfaces 97; 99. Accordingly, there are two check valves acting in opposite directions. When one check valve opens, the other check valve is preloaded in the closing position. This type of construction results in a dividing wall 69 that is easy to produce and which is constructed in two parts. Further, it is possible that the minimum cross section 79 is formed in the valve seat surface 97; 99 and accordingly forms a pre-opening valve arranged hydraulically in parallel with the adjustable damping valve assembly 43. Comparable to the description referring to FIG. 2, a valve disk of the check valve or the valve seat surface 97; 99 can be provided with a cutout or stamping so that the minimum cross section 79 is opened even when the check valve is closed otherwise.

In a construction of this kind, the main flow proceeds from the working chamber 17 into the adjustable damping valve device 3 and then further into the valve space 67 of the damping valve assembly 45. Proceeding from the latter, the auxiliary flow does not pass the main stage valve 57 or inlet valve 61, but rather the check valve arrangement 75 of the dividing wall 69. When there is an incident flow from the direction of the piston rod side working chamber 15, the inlet into the distributor space 89 is open to the maximum extent and the minimum cross section is accordingly inactive. Only the damping valve assembly 45 is impinged via this flow path. A parallel flow path through the check valve 95; 99 is blocked.

Figure 4:
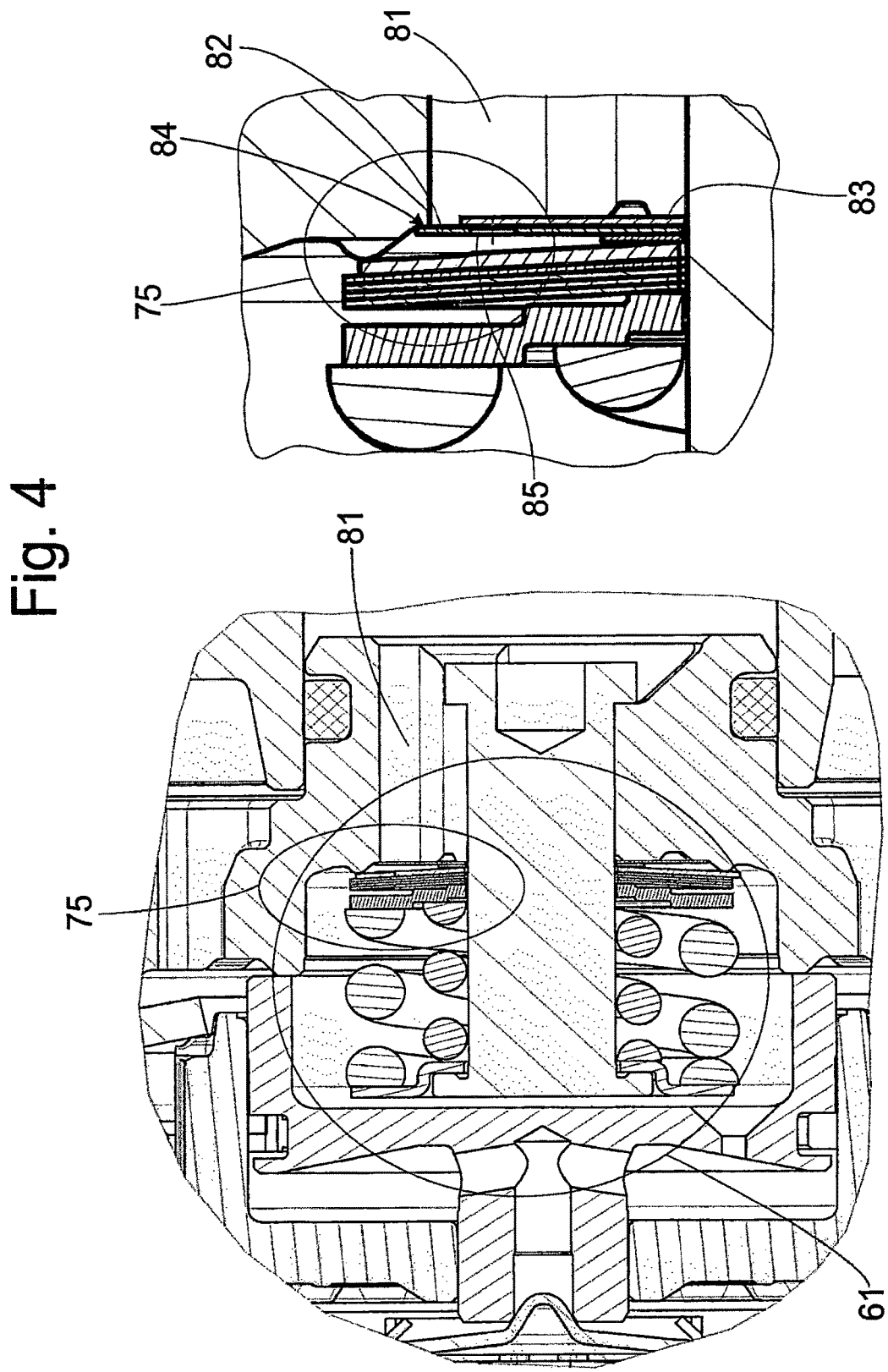

In this construction of dividing wall 69, a check valve arrangement 75 according to the description referring to FIG. 2 in conjunction with FIG. 3 or 4 is possible, i.e., during a compression movement of piston rod 7 the auxiliary flow flows through the main stage valve 57, which determines the minimum cross section 79 even when main stage valve 57 is closed to the maximum extent.

In principle, it is also possible to reduce the damping force for the compression movement when the damping valve assembly 45 for the extension movement is opened by the actuator 47 beyond the minimum cross section 79.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An adjustable damping valve device comprising:
   a first adjustable damping valve assembly for a first flow direction and configured to generate a damping force for only one flow direction;
   a second adjustable damping valve assembly for a second flow direction having a minimum cross section through which damping medium can flow in a setting for maximum damping force and configured to generate a damping force in both flow directions; and
   a respective electromechanical actuator for each of the first adjustable damping valve assembly and the second adjustable damping valve assembly,
   wherein the first adjustable damping valve assembly and the second adjustable damping valve assembly are adjustable independently from one another.

2. The adjustable damping valve device according to claim 1, wherein the first adjustable damping valve assembly and the second adjustable damping valve assembly are arranged in a common housing.

3. The adjustable damping valve device according to claim 2, wherein the common housing for the first adjustable damping valve assembly and the second adjustable damping valve assembly comprises valve chambers that are spatially separated from one another by a dividing wall.

4. The adjustable damping valve device according to claim 3, wherein each valve chamber has only one connection to an individual working chamber of a vibration damper.

5. The adjustable damping valve device according to claim 1, further comprising
a check valve assembly is associated with at least one of the first adjustable damping valve assembly and the second adjustable damping valve assembly,
wherein the check valve assembly releases a complete passage in one flow direction and a limited passage in an opposite direction.

6. The adjustable damping valve device according to claim 5, wherein the at least one of the first adjustable damping valve assembly and the second adjustable damping valve assembly has a passive inlet valve, wherein the check valve assembly is arranged in the passive inlet valve.

7. The adjustable damping valve device according to claim 5, wherein the check valve assembly is arranged in flow-off direction downstream of at the at least one of the first adjustable damping valve assembly and the second adjustable damping valve assembly.

8. The adjustable damping valve device according to claim 1, wherein a check valve assembly is arranged in flow-in direction between the first adjustable damping valve assembly and the second adjustable damping valve assembly.

9. The adjustable damping valve device according to claim 8, wherein the check valve assembly is arranged inside a dividing wall of a common housing for the first adjustable damping valve assembly and the second adjustable damping valve assembly.

10. The adjustable damping valve device according to claim 1, wherein the second adjustable damping valve assembly has a main stage valve body which, together with a valve seat surface, forms a main stage valve which provides the minimum cross section.

11. The adjustable damping valve device according to claim 1, wherein the minimum cross section is formed by a pre-opening valve arranged in parallel with the first adjustable damping valve assembly.

12. The adjustable damping valve device according to claim 11, wherein the pre-opening valve is part of a check valve arrangement.

13. The adjustable damping valve device according to claim 12, wherein the check valve arrangement has two check valves opening in opposite directions.

14. The adjustable damping valve device according to claim 8, wherein the check valve assembly has two check valves opening in opposite directions.

* * * * *